(12) United States Patent  
Chai et al.

(10) Patent No.: US 8,325,978 B2  
(45) Date of Patent: Dec. 4, 2012

(54) METHOD, APPARATUS AND COMPUTER PROGRAM PRODUCT FOR PROVIDING ADAPTIVE GESTURE ANALYSIS

(75) Inventors: Xiujuan Chai, Beijing (CN); Kongqiao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 1038 days.

(21) Appl. No.: 12/261,108

(22) Filed: Oct. 30, 2008

(65) Prior Publication Data

US 2010/0111358 A1   May 6, 2010

(51) Int. Cl.  
*G06K 9/00* (2006.01)
(52) U.S. Cl. .................... 382/103; 382/106; 382/154
(58) Field of Classification Search .................. None  
See application file for complete search history.

(56) References Cited

U.S. PATENT DOCUMENTS

2002/0175921 A1* 11/2002 Xu et al. ................... 345/589  
2003/0156756 A1   8/2003 Gokturk et al.

FOREIGN PATENT DOCUMENTS

WO   WO 2005114556 A2 * 12/2005

\* cited by examiner

*Primary Examiner* — Vu Le  
*Assistant Examiner* — Thomas A James  
(74) *Attorney, Agent, or Firm* — Alston & Bird LLP

(57) ABSTRACT

A method for providing adaptive gesture analysis may include dividing a distance range into a plurality of depth ranges, generating a plurality of intensity images for at least two image frames, each of the intensity images providing image data indicative of a presence of objects at a corresponding depth range for a respective image frame, determining motion variation between the two image frames for each corresponding depth range, and determining depth of a target based at least in part on the motion variation. An apparatus and computer program product corresponding to the method are also provided.

26 Claims, 8 Drawing Sheets

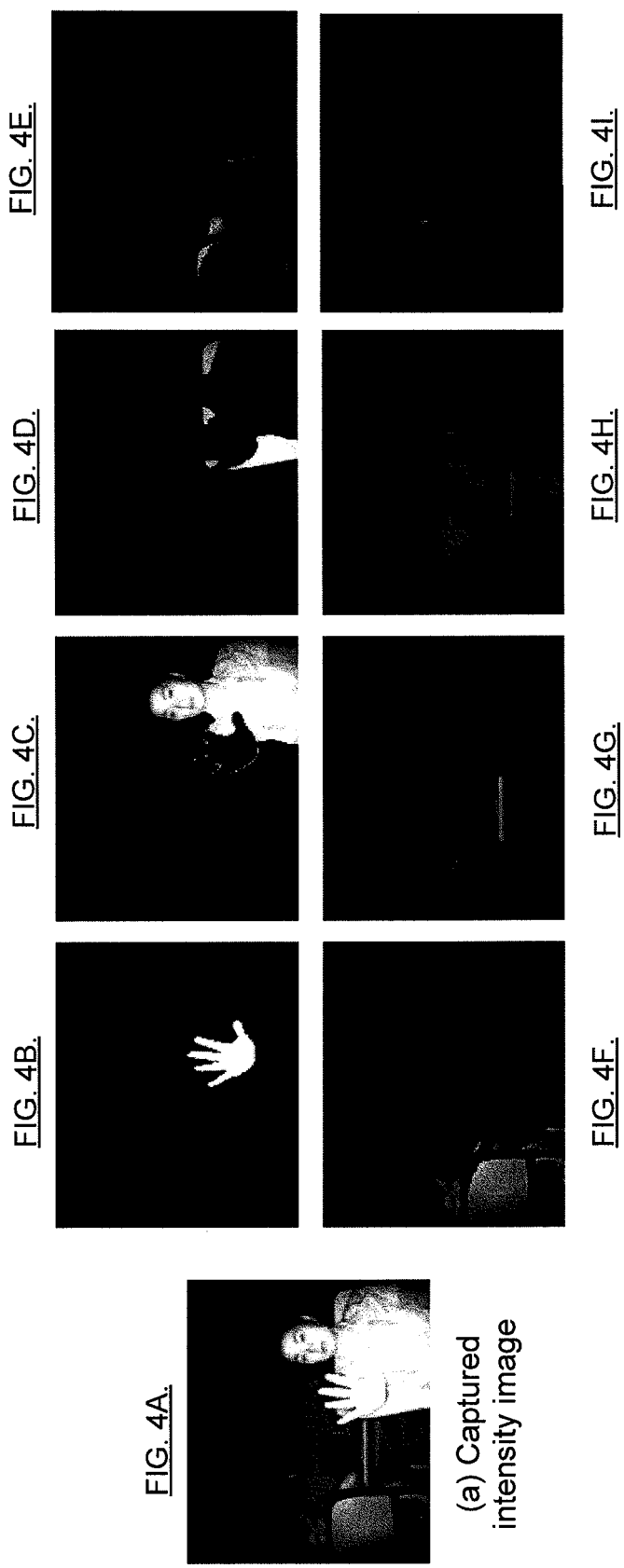

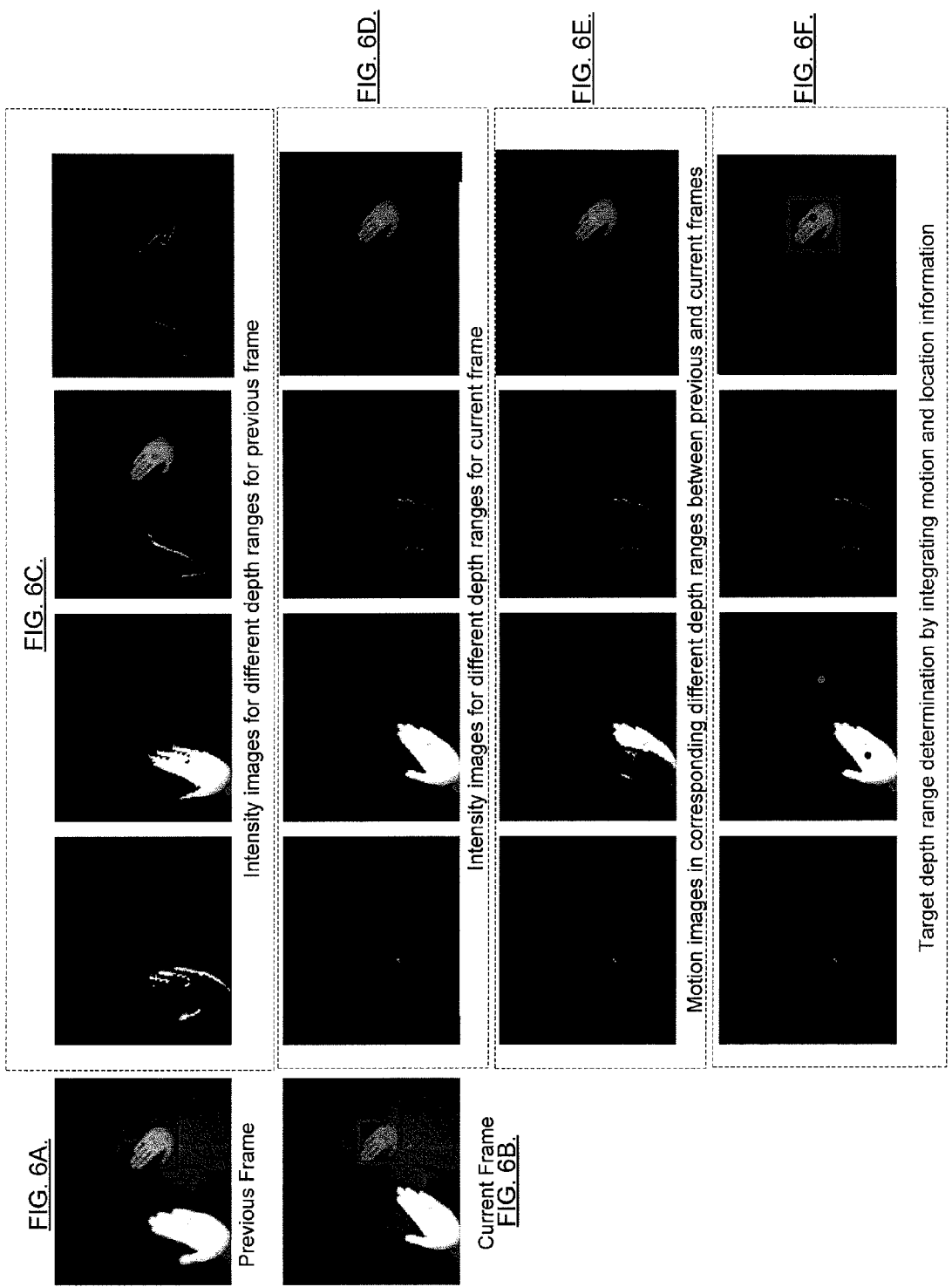

METHOD, APPARATUS AND COMPUTER PROGRAM PRODUCT FOR PROVIDING ADAPTIVE GESTURE ANALYSIS

TECHNOLOGICAL FIELD

Embodiments of the present invention relate generally to user interface technology and, more particularly, relate to a method, apparatus and computer program product for providing gesture analysis for visual interaction systems.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to simplifying human to machine interfaces for HCI (human-computer interaction). With recent developments in the area of the computing devices and hand-held or mobile devices improving the capabilities of such devices, next generation HCI is on the minds of many. Furthermore, given that the devices will tend to increase in their capacity to create content, store content and/or receive content relatively quickly upon request, and given also that mobile electronic devices such as mobile phones often face limitations in display size, text input speed, and physical embodiments of user interfaces (UI), challenges are often created in the context of HCI.

Furthermore, improvements in HCI may also enhance user enjoyment and open possibilities for user interface with computing devices in environments that may otherwise have presented changes for effective HCI. One such improvement relates to gesture recognition. Compared with other interactive mechanisms currently employed in HCI such as, for example, keypad and mouse, some may consider gesture recognition to improve the naturalness and facility of communication. As such, certain applications have been developed to enable gesture recognition for use as a command controller in digital home appliances, for use in file/web navigation or for use as a substitute for the commonly used remote controller. However, current mechanisms for gesture analysis are often slow or cumbersome to employ. Moreover, many gesture analysis mechanisms that are currently in place may suffer from difficulties in detecting or tracking gestures in unconstrained environments. For example, embodiments with changing or certain lighting configurations and environments with difficult to distinguish backgrounds may present challenges in gesture tracking. Thus, given the general utility of next generation HCI, improvements in gesture analysis may be desirable.

BRIEF SUMMARY OF SOME EXAMPLES OF THE INVENTION

A method, apparatus and computer program product are therefore provided to enable the use of gesture analysis in, for example, a visual interaction system. In some exemplary embodiments, an adaptive gesture tracking scheme may utilize depth data to analyze image data. For example, multiple intensity images may be considered for various depth ranges. In an exemplary embodiment, the intensity images at the various different depth ranges may be analyzed for motion in order to determine a depth in which a target (e.g., a hand or other gesturing appendage) is located to enable tracking of the target. As such, motion variation en each depth range may be used, in some cases along with other cues, in order to provide relatively fast and accurate target tracking. In some embodiments, three dimensional (3D) depth data may be utilized for providing the depth data for intensity images to enable adaptive gesture analysis in unconstrained environments. As such, some exemplary embodiments of the invention may provide for relatively robust and fast gesture analysis.

In an exemplary embodiment, a method of providing adaptive gesture analysis is provided. The method may include dividing a distance range into a plurality of depth ranges, generating a plurality of intensity images for at least two image frames in which each of the intensity images may provide image data indicative of a presence of objects at a corresponding depth range for a respective image frame, determining motion variation between the two image frames for each corresponding depth range, and determining depth of a target based at least in part on the motion variation.

In another exemplary embodiment, a computer program product for providing adaptive gesture analysis is provided. The computer program product includes at least one computer-readable storage medium having computer-executable program code portions stored therein. The computer-executable program code portions may include first, second, third and fourth program code portions. The first program code portion is for dividing a distance range into a plurality of depth ranges. The second program code portion is for generating a plurality of intensity images for at least two image frames. Each of the intensity images may provide image data indicative of a presence of objects at a corresponding depth range for a respective image frame. The third program code portion is for determining motion variation between the two image frames for each corresponding depth range. The fourth program code portion is for determining depth of a target based at least in part on the motion variation.

In another exemplary embodiment, an apparatus for providing adaptive gesture analysis is provided. The apparatus may include a processor. The processor may be configured to divide a distance range into a plurality of depth ranges, generate a plurality of intensity images for at least two image frames in which each of the intensity images may provide image data indicative of a presence of objects at a corresponding depth range for a respective image frame, determine motion variation between the two image frames for each corresponding depth range, and determine depth of a target based at least in part on the motion variation.

In yet another exemplary embodiment, an apparatus for providing adaptive gesture analysis is provided. The apparatus may include means for dividing a distance range into a plurality of depth ranges, means for generating a plurality of intensity images for at least two image frames in which each of the intensity images may provide image data indicative of a presence of objects at a corresponding depth range for a respective image frame, means for determining motion variation between the two image frames for each corresponding depth range, and means for determining depth of a target based at least in part on the motion variation.

Embodiments of the invention may provide a method, apparatus and computer program product for employment, for example, in mobile or fixed environments. As a result, for example, computing device users may enjoy an improved capability for interaction with their respective computing devices.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

FIG. 4 (including FIGS. 4A through 4I) illustrates generated intensity images corresponding to each of various different depths according to an exemplary embodiment of the present invention;

Figure 7:
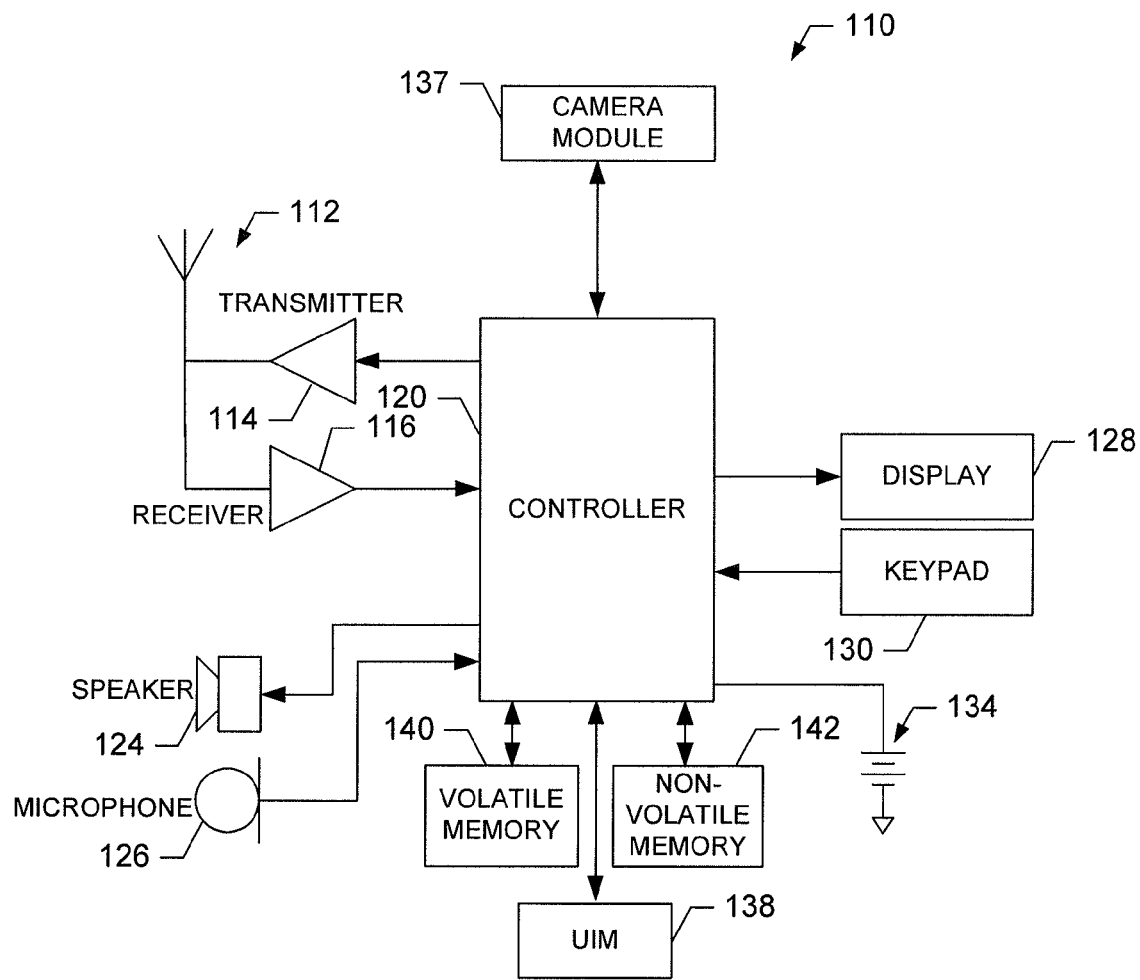
Figure 8:
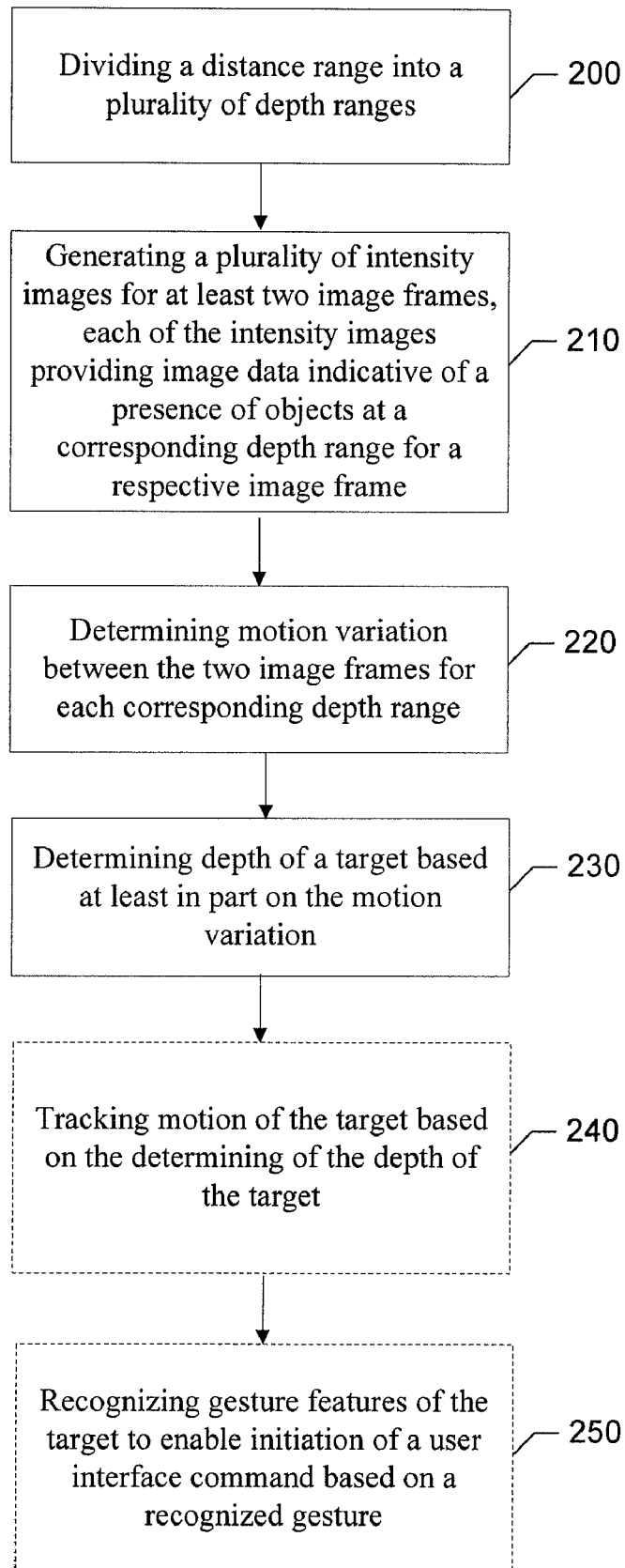

FIG. 5 (which includes FIGS. 5A through 5N) illustrates intensity images for adjacent frames and an indication of relative motion therebetween according an exemplary embodiment of the present invention;

FIG. 6 (including FIGS. 6A through 6F) illustrates stages of a process of determining target depth according to an exemplary embodiment of the present invention;

FIG. 7 illustrates a block diagram of a mobile terminal that may benefit from exemplary embodiments of the present invention; and FIG. 8 is a flowchart according to an exemplary method for providing gesture analysis according to an exemplary embodiment of the present invention.

DETAILED DESCRIPTION OF SOME EMBODIMENTS OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Additionally, the terms near and far are used herein in the relative sense so as to refer to objects being closer and further from some point with respect to one another, but not to otherwise represent any particular or quantifiable position. Thus, use of any such terms should not be taken to limit the spirit and scope of embodiments of the present invention.

Some embodiments of the present invention may provide a mechanism by which improvements may be experienced in relation to gesture analysis. In this regard, for example, some embodiments may provide for a real-time gesture analysis scheme, which may be suitable for interactive activities on hand-held or other computing devices. Thus, a user may be enabled to control a device (e.g., the hand-held or computing device of the user or even a remote device) by gesture rather than operating the device manually. Some exemplary embodiments may provide automatic gesture analysis via a scheme that integrates various components such as, for example, a 3D camera, a depth analyzer, a motion analyzer, a target tracker and a gesture recognizer. Target tracking, according to some embodiments of the present invention, may provide relatively accurate target (e.g., hand) location with a relatively low sensitivity to background, illumination, hand scale variation and movement, etc.

Target tracking may be realized, in an exemplary embodiment, by a detection-based strategy. In this regard, for example, target location in each frame may be determined based on skin detection and multiple useful cues, such as scale, position information (e.g., in a previous frame) and/or the like. Detection based tracking according to some embodiments may provide relatively accurate and fast tracking that may be used in relation to real-time applications.

Figure 1:
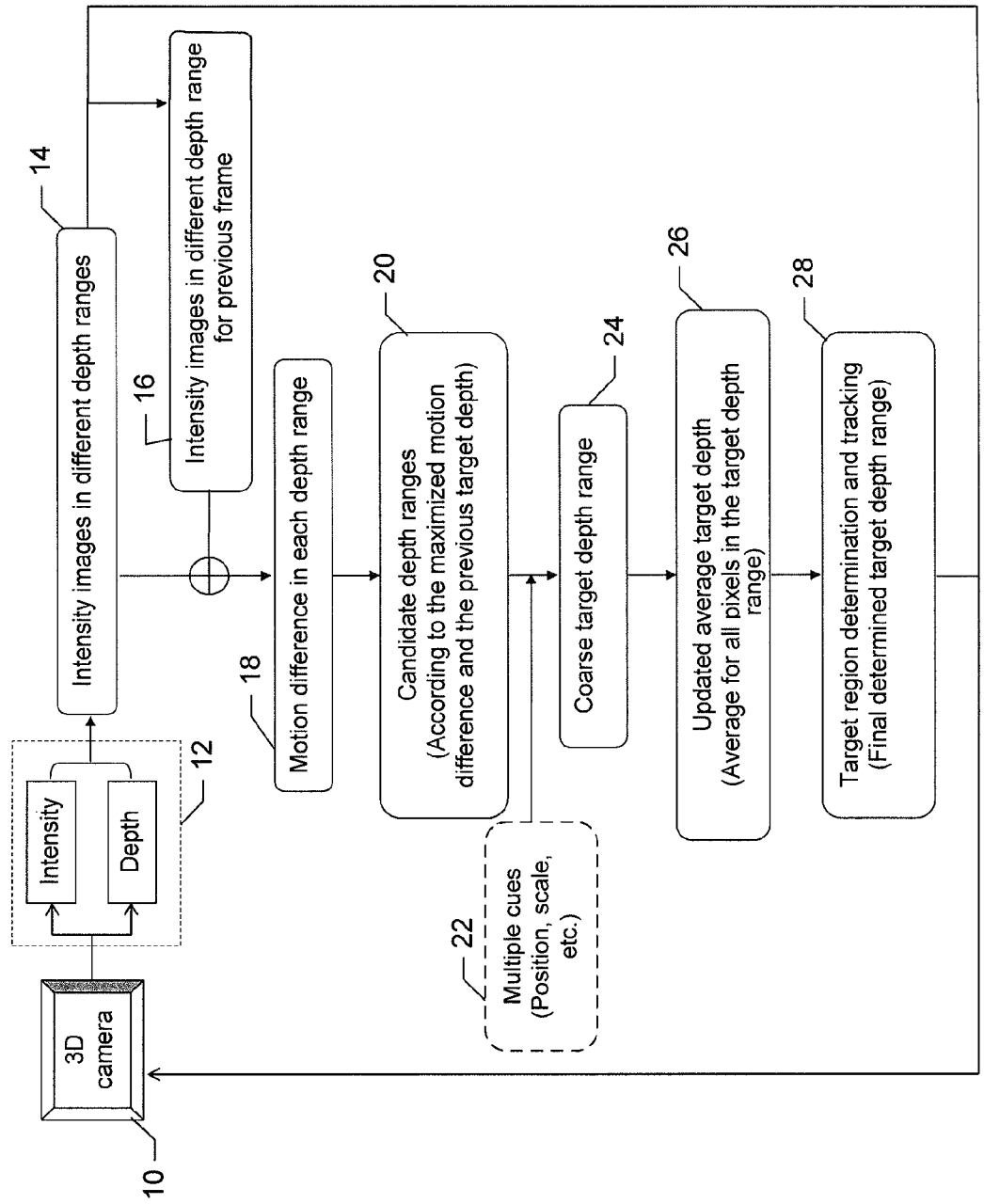
FIG. 1 illustrates one example of a adaptive gesture analysis process for a UI controller according to an exemplary embodiment of the present invention.

FIG. 1 illustrates one example of an adaptive gesture analysis process for a UI controller according to an exemplary embodiment of the present invention. It should be noted that while an exemplary embodiment will be described below in the context of target detection based gesture analysis for a hand, other portions of the body may also be included with respect to gesture analysis. For example, arm positioning, foot positioning or the like may also be considered with respect to gesture analysis assuming the arms, feet, etc., are exposed for enabling target detection. Furthermore, the process of FIG. 1 is merely exemplary and thus other embodiments may include modifications such as the inclusion of additional or different operations, the same or different operations in a different order, and/or the deletion of some operations.

Figure 2:
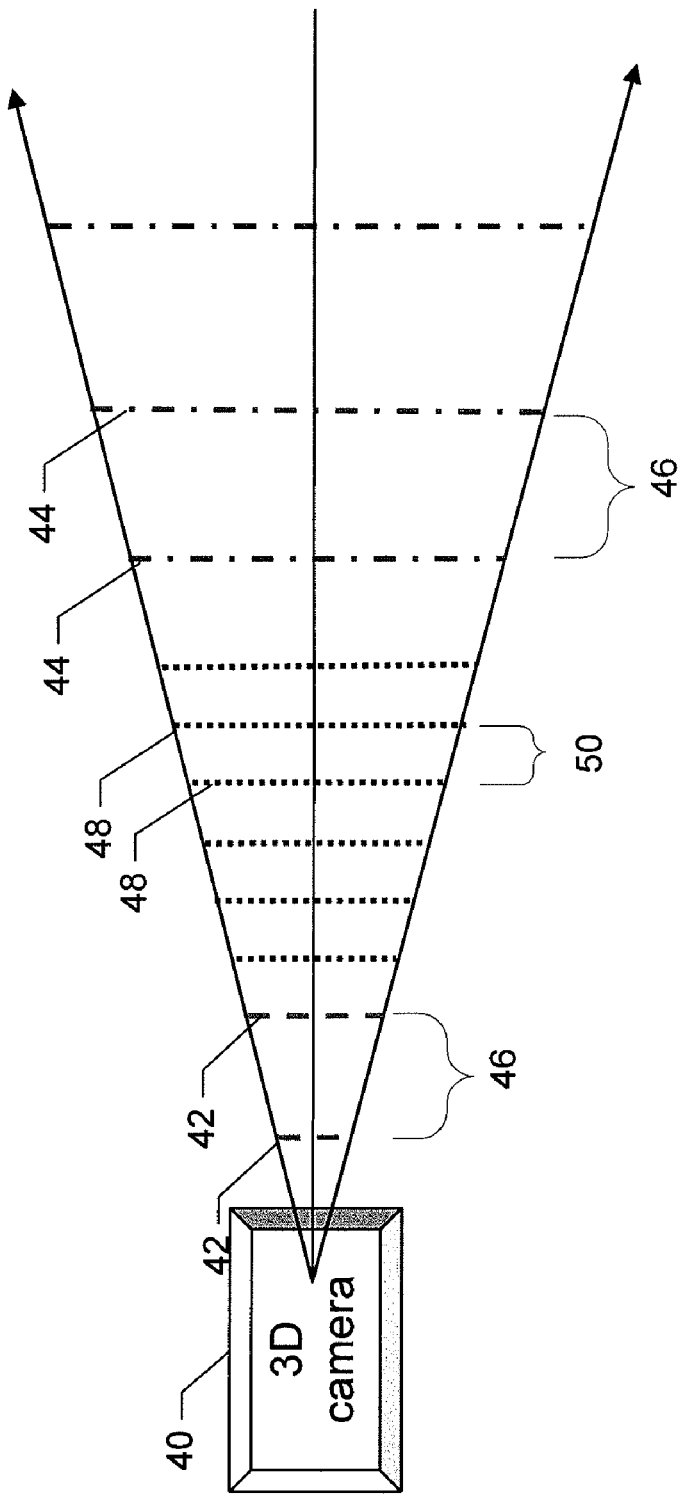
FIG. 2 illustrates a diagram of different depth intervals dividing up the whole depth scope of a three dimensional image according to an exemplary embodiment of the present invention.

As shown in FIG. 1, which is a flow diagram showing various operations that may be conducted in association with an exemplary embodiment, image data (e.g., video data) may initially be received at operation 10. The image data may be received from a camera associated with a device performing gesture recognition according to an exemplary embodiment insofar as the camera may be a part of the device or in communication with the device. In some embodiments, communication between the camera and other components used in gesture analysis may be real-time or at least with relatively little delay. In an exemplary embodiment, the camera may be a 3D camera 40 capable of providing 3D depth data and an intensity image simultaneously as shown, for example, in FIG. 2. As can be seen from FIG. 2, the 3D camera may be capable of providing data separable into various different depth intervals. The depth intervals may be equidistant or may have varying distances therebetween (e.g., near depths 42 and far depths 44 may have larger intervals 46 while medium distances 48 may have smaller intervals 50).

At operation 12, depth data and intensity data may be extracted from the image data gathered by the 3D camera. A frame of image data received at operation 10 may then be segmented into different depth ranges to provide intensity images at varying depth ranges at operation 14. The analysis of the image data may be conducted on a frame-by-frame basis such that an intensity image for a previous (or subsequent) frame may be compared to the segmented images for each respective different depth range at operation 16. At operation 18, motion differences may be analyzed at each depth range. Motion analysis with respect to adjacent frames may be useful in identifying a target area (e.g., a gesture capable appendage such as the hand) since in many situations the target which is performing the gesture may be expected to have the most change from one frame to the next. Thus, while depth of the target cannot necessarily be predicted, it may be predicted that the depth at which the target is located is expected to see more significant motion than other depths.

Based on motion analysis with respect to the various depth ranges, candidate depth ranges may be identified at operation 20. In this regard, for example, candidate depth ranges showing motion above a certain threshold, or as a maximum or at least higher relative to other depth ranges or frames for a given depth range may be identified as candidate depth ranges. In some exemplary embodiments, one or more other cues (e.g., position, scale, and/or the like) may be considered along with the motion analysis of candidate depth ranges at operation 22. Based on the motion of the candidate depth ranges (and in some cases also based on the cues), a coarse target depth range may be determined at operation 24. At operation 26, an updated average target depth may be determined (e.g., by averaging all pixels in the target depth range). A target region may then be determined and tracked based on the final determined target depth range at operation 28.

Thereafter, the target may continue to be tracked and motion or changes with respect to features that may be extracted from the target region being tracked (e.g., a hand region), may be used for gesture analysis. In an exemplary embodiment, gesture analysis may be performed by comparing features from the target region being tracked to features in a stored database of features that correspond to specific gestures. By determining a match (or substantial similarity to within a threshold amount) between features in the database (e.g., a matching database) and the features extracted from the target region being tracked, a gesture corresponding to the specific gesture associated with the matched features from the database may be recognized.

If a particular gesture is recognized, a corresponding command may be executed. As such, for example, a database may store information associating gestures with respective commands or UI functions. Thus, for example, if a clenched fist is recognized while playing music or video content and the clenched fist is associated with a stop command, the music or video content being rendered by be stopped.

Figure 3:
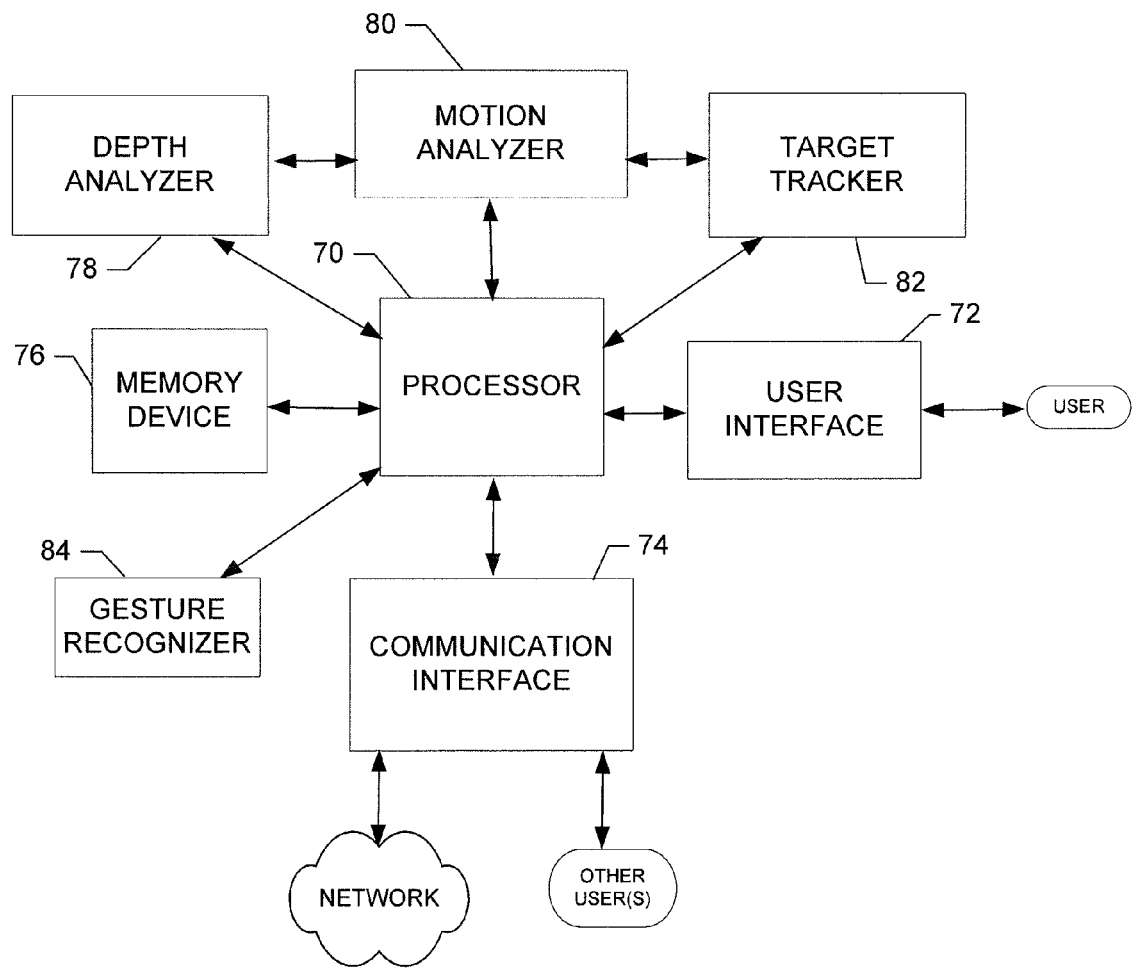
FIG. 3 illustrates a schematic block diagram of an apparatus for enabling gesture analysis according to an exemplary embodiment of the present invention.
Figure 5F:
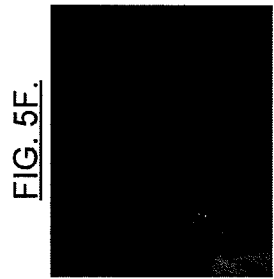
Figure 5J:
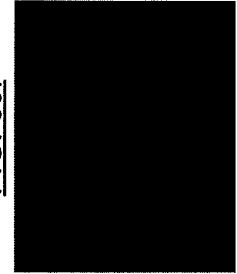
Figure 5N:
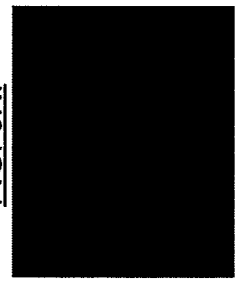
Figure 5E:
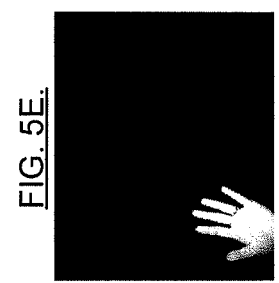
Figure 5I:
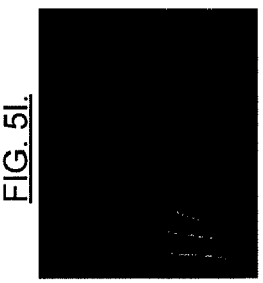
Figure 5M:
Figure 5D:
Figure 5H:
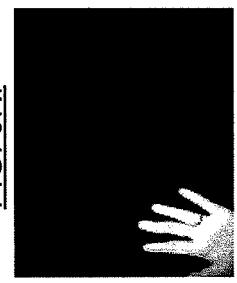
Figure 5L:
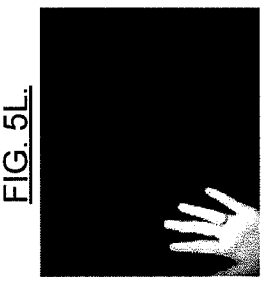
Figure 5C:
Figure 5G:
Figure 5K:
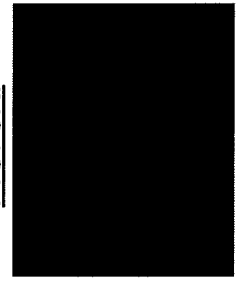
Figure 5A:
Figure 5B:
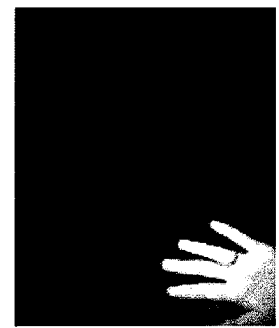

FIG. 3 illustrates a schematic block diagram of an apparatus for enabling adaptive gesture analysis according to an exemplary embodiment of the present invention. An exemplary embodiment of the invention will now be described with reference to FIG. 3, in which certain elements of an apparatus for enabling gesture analysis are displayed. The apparatus of FIG. 3 may be employed, for example, on a mobile terminal (e.g., the mobile terminal 110 of FIG. 7) or a variety of other devices, both mobile and fixed (such as, for example, a network device, personal computer, laptop computer, or the like). Alternatively, embodiments may be employed on a combination of devices. Accordingly, some embodiments of the present invention may be embodied wholly at a single device (e.g., the mobile terminal 110) or by devices in a client/server relationship. Furthermore, it should be noted that the devices or elements described below may not be mandatory and thus some may be omitted in certain embodiments.

Referring now to FIG. 3, an apparatus for enabling adaptive gesture analysis is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a mobile terminal (e.g., the mobile terminal 110), the user interface 72 may include, among other devices or elements, any or all of a speaker, a microphone, a display, and a keyboard or the like.

In an exemplary embodiment, the processor 70 may be embodied as, include or otherwise control a depth analyzer 78, a motion analyzer 80, a target tracker 82 and a gesture recognizer 84. The depth analyzer 78, the motion analyzer 80, the target tracker 82, and the gesture recognizer 84 may each be any means such as a device or circuitry embodied in hardware, software or a combination of hardware and software (e.g., processor 70 operating under software control) that is configured to perform the corresponding functions of the depth analyzer 78, the motion analyzer 80, the target tracker 82, and the gesture recognizer 84, respectively, as described below. In an exemplary embodiment, the depth analyzer 78, the motion analyzer 80, the target tracker 82, and/or the gesture recognizer 84 may each be in communication with a media capturing module (e.g., the camera module 137 of FIG. 7) to receive image data for use in analysis as described below.

The depth analyzer 78 may be configured to segment input image data for each frame into data corresponding to each of various different depth ranges. The depth analyzer 78 may then generate intensity images corresponding to each of the various different depth ranges. In an exemplary embodiment, the depth analyzer 78 may be configured to separate the whole distance range into many small intervals, e.g., D={$D_1$ $D_2$ ... $D_N$}. The intervals can be uneven, as shown in FIG. 3. The depth analyzer 78 may then, for each intensity frame $I_t$, generate a corresponding intensity image $I_t^i$ for each depth range $D_i$ ($1 \leq i \leq N$). With respect to the generation of intensity images for each depth range, the intensity of any point that is not at the depth range for the corresponding intensity image is set to zero. Thus, only image intensity at the respective depth range is provided for each intensity image at the various different depth ranges.

FIG. 4 (including FIGS. 4A through 4I) shows one example of intensity images that may be generated by the depth analyzer 78 in different depth ranges for one frame. In this regard, FIG. 4A shows a captured intensity image not yet modified by the depth analyzer 78. FIGS. 4B through 4I show generated intensity images at each of various different ranges extending from closest to the camera generating the captured intensity image (at FIG. 4B) to farthest away from the camera (at FIG. 4I). In FIG. 4B, the intensity image representing data closest to the camera has detected a hand of the person in focus in the intensity image. All image data representing objects not at the depth of the hand has been set to zero. In FIG. 4C, the intensity image represents data at the approximate depth of the face and torso of the person in the intensity image and has set data at all other depths to zero. In FIG. 4D, the intensity image represents data at the approximate depth of the person's chair, setting all other data to zero. This process continues such that, for example, in FIG. 4F the intensity image represents data at the approximate depth of another person's chair, setting all other data to zero, and in FIG. 4H, the intensity image represents data at the approximate depth of the work station behind the other person, setting all other data to zero. In an exemplary embodiment, the multiple intensity images generated by the depth analyzer 78 may be communicated to the motion analyzer 80 for continued processing.

The motion analyzer 80 may be configured to analyze data at each depth range relative to adjacent frames of data at the same corresponding depth range. Thus, for example, the motion analyzer 80 may compare an intensity image for a first frame (e.g., the frame in FIG. 4B) to a second frame (e.g., an adjacent frame) at the same depth range in order to detect motion from one frame to the next. As indicated above, a gesturing hand is likely to cause more motion to be detected in subsequent frames than objects at the various different depth ranges. As such, for example, if the person in focus in the intensity image is gesturing to the camera, it is likely that an adjacent frame (previous or subsequent) to the frame at FIG. 4B will show motion (or at least more motion) than the other frames (e.g., the frames of FIG. 4C through 4I) since the other frames show data corresponding to objects that are non-moving or at least less likely to show much movement as compared to the person's hand.

In an exemplary embodiment, the motion analyzer 80 may be configured to compute an image difference $\Delta I_{(t,t-1)}^i$ for each depth range between the current frame $I_t$ and the previous frame $I_{t-1}$ according to the following formula:

$$\Delta I_{(t,t-1)}^i = \sum_{0 \leq x \leq W, 0 \leq y \leq H} I_t^i(x,y) - I_{t-1}^i(x,y),$$

where W and H are image width and height separately and $$I_t^i(x,y) - I_{t-1}^i(x,y) = \begin{cases} I_t^i(x,y) - I_{t-1}^i(x,y), & \text{if } I_t^i(x,y) - I_{t-1}^i(x,y) > 0 \\ 0, & \text{else.} \end{cases}$$

The value $\Delta I_{(t,t-1)}^i$ may be considered as relative motion and give the example for the motion $\Delta I_{(t,t-1)}^i$ in each depth range.

FIG. 5 (which includes FIGS. 5A through 5N) illustrates an example of the operation of the motion analyzer 80 according to an exemplary embodiment. In this regard, FIG. 5A shows an intensity image for a previous frame, while FIG. 5B shows an intensity image for the current frame. FIGS. 5C through 5J show intensity images at each of four different depth ranges relative to both the current and previous frames as generated by the depth analyzer 78. Specifically, FIG. 5C represents an intensity image corresponding to the previous frame at a first depth range. FIG. 5D represents an intensity image corresponding to the previous frame at a second depth range. FIG. 5E represents an intensity image corresponding to the previous frame at a third depth range. FIG. 5F represents an intensity image corresponding to the previous frame at a fourth depth range. Meanwhile, FIG. 5G represents an intensity image corresponding to the current frame at the first depth range. FIG. 5H represents an intensity image corresponding to the current frame at the second depth range. FIG. 5I represents an intensity image corresponding to the current frame at the third depth range. FIG. 5J represents an intensity image corresponding to the current frame at the fourth depth range. FIGS. 5K through 5N represent an output of the motion analyzer 80 indicating relative motion from the previous frame to the current frame. Specifically, FIG. 5K shows that no relative motion was noted from the previous frame to the current frame at the first depth range. FIG. 5L shows that relative motion was noted from the previous frame to the current frame in that the hand has moved from the third depth range (see FIG. 5E) to the second depth range (see FIG. 5H). FIG. 5M shows that little motion has been detected into the third depth range from the previous frame to the current frame as the hand has left the third depth range to enter the second depth range. FIG. 5N shows that there is essentially no relative motion between the current and previous frames at the fourth depth.

From the computation procedure performed by the motion analyzer 80, it may be appreciated that relative motion $\Delta I_{(t,t-1)}^i$ only concerns the non-zero pixels in the specific depth range of the current frame. Because the non-zero pixels correspond to the objects (e.g., the target or other objects) located in the specific depth range, relative motion $\Delta I_{9t,t-1)}^i$ may be used as a measurement to find the candidate target depth. In this regard, the depth showing the greatest relative motion (e.g., the second depth range) in FIG. 5K indicates that the target (e.g., the hand) is in the second depth range.

In some embodiments, absolute motion may also be computed, for example, via $$\|\Delta I_{(t,t-1)}^i\| = \sum_{0 \leq x \leq W, 0 \leq y \leq H} \text{abs}(I_t^i(x,y) - I_{t-1}^i(x,y)).$$

The absolute motion computation may be used to evaluate whether motion in a certain depth range has occurred. These two measurements (relative motion and absolute motion), which provide an indication of motion variation, may be put to further use in target depth determination, described in greater detail below.

Using the obtained motion variation for each depth range, it may be possible to distinguish the target and other objects. In some cases, one or more additional cues, such as position, scale, etc., may be used to assist in distinguishing the target from other objects. The target tracker 82 may be configured to automatically determine (e.g., based on the motion variation between adjacent frames for various different depth ranges) the depth of the target. In this regard, once the motion variation has been determined as described above, the target tracker 82 may be configured to select one of the possible depth ranges (e.g., candidate depth ranges) as the target depth range based on the relative motion determined in the corresponding depth range, and possibly also based on the additional cue(s). The target tracker 82 may then extract the target from the selected intensity image of the corresponding depth range and track the target.

In an exemplary embodiment, the target tracker 82 may be configured to perform the following operations:

1) In the depth range of the target $D_k$ determined in previous frame, compare the image difference $\|\Delta I_{(t,t-1)}^k\|$ with a pre-defined threshold T. If $\|\Delta I_{(t,t-1)}^k\| < T$, then the depth of the target is regarded to be unchanged.

2) If $\|\Delta I_{(t,t-1)}^k\| \geq T$, then the depth of the target is regarded as changed. Considering the continuity of the target motion, the target tracker 82 may select m candidate depth ranges from several adjacent depth ranges of $D_k$. The target tracker 82 may then sort the depth ranges according to the relative motion $\Delta I_{(t,t-1)}^k$. Then, in terms of the top-m $\Delta I_{(t,t-1)}^k$, the corresponding depth ranges may be chosen as candidates of target depth.

3) Non-target objects may then be eliminated to reveal the depth range of the target. In this regard, for example, the target tracker 82 may be configured to analyze the multiple intensity images (corresponding to $\Delta I_{(t,t-1)}^k$) at each candidate depth a step further by integrating multiple constraints (e.g., position information, scale factor, and/or the like) to get the target location. In an exemplary embodiment, position may be denoted by the barycenter of certain object region. For the adjacent two frames, the scale and the position of the target region will likely not change tremendously. Thus, the position change can be used as an effective constraint to determine which object is the target to be tracked. In the example shown in FIG. 6, the position change in a certain depth range may be defined as the distance between the barycenter of the object in the current frame and the target position in previous frame. Therefore, the object corresponding to the minimum position change and a similar scale is determined to be the target. Accordingly, the object depth is regarded to be the coarse depth of target $D_{k'}$, as shown, for example, in the bottom row of FIG. 6 (FIG. 6F).

4) Once the depth range of the target $D_{k'}$ is determined, more accurate target depth may be provided using a subsequent target segmentation:

$$d = \sum_{I_t^{k'}(x,y) \neq 0} d(x,y)/n,$$

in which n is the number of the pixel which lies in the depth range $D_{k'}$. Then target pixels may be obtained by a depth constraint: $d - d_T \leq depth(x,y) \leq d + d_T$, where $d_T$ is the experiential threshold.

The target tracker 82 may be configured to track the target (e.g., the user's hand) via the depth determination process and segmentation of the intensity image containing the target. In order to enable gesture recognition with respect to a hand, accurate location of the hand may improve the quality of analysis and the resulting output. Based on the above described mechanism for determining hand location, hand tracking may be accomplished over consecutive frames to enable gesture detection.

Some embodiments may also employ the gesture recognizer 84, which may be configured to perform gesture matching between features associated with the target and features associated with a particular known gesture. For example, a database of known gestures and their respective features may be provided for comparison to features of a current gesture. If similarity between compared gestures is sufficient, the gesture recognizer 84 may associate a current gesture with the particular known gesture thereby identifying or recognizing the current gesture.

In an exemplary embodiment, the database of known gestures may be generated by the user (or by another) in an offline phase. Thus, multiple samples for each gesture may be collected to compose a gallery of gestures. In an exemplary embodiment, size normalization may initially be performed and each sample may be transformed into a feature vector according to the above described scheme and recorded as a template to be used for matching purposes. A recognized gesture may be utilized to trigger or cause execution of a particular command associated with the recognized gesture. In this regard, for example, the gesture recognizer 84 may communicate the identity of a recognized gesture to the processor 70, which may execute (e.g., via the user interface 72) a corresponding UI command. The command may be used to direct a UI system to execute a corresponding operation.

FIG. 6 (which includes FIGS. 6A through 6F) shows an example illustrating the whole procedure for target depth determination. FIG. 6A shows an intensity image for a previous frame and FIG. 6B shows an intensity image for the current frame. As shown in the series of images illustrated in FIG. 6C, the depth analyzer 78 determines intensity images for each respective depth range for various different depths relating to the previous frame. The depth analyzer 78 also determines intensity images for each respective depth range for the respective various different depths relating to the current frame as shown in the series of images in FIG. 6D. The motion analyzer 80 then determines motion variation between the current and previous frames at each depth range as shown in the series of images in FIG. 6E. The target tracker 82 then performs target depth range determination by integrating motion and location information for each depth range as shown in the series of images in FIG. 6F. As indicated in FIG. 6, the target (e.g., the hand of the person shown in the current and previous frames) is located in depth 3 in the previous frame. However, through analysis of adjacent depth ranges, the new location of the target is determined to be in depth 4 in the current frame. The motion in depth 2 results from another object (in this case, another person's hand) and it is eliminated for considering the position constraint.

Based on the descriptions above, embodiments of the present invention may provide for segmentation of images to locate a target (e.g., a hand) to enable robust tracking in an efficient manner. Accordingly, relatively accurate target tracking results and hand gesture recognition rate may be improved. Use of the 3D camera enables the provision of 3D depth data in real time, which may be used by embodiments of the present invention to eliminate or substantially reduce the effect of the background and illumination on gesture recognition accuracy. The partitioning of depth ranges may also assist with respect to analysis of content with different depths for each frame. The motion computation described herein may enable the capture of object motion within each depth range, which includes the motions of the target and other objects. Through comparing the motions in different ranges and integrating multiple useful cues, the depth of the target may be determined automatically to enable extraction of the hand. Based on the accurate hand segmentation and tracking results, the gesture recognition accuracy can be improved accordingly. Thus, for example, tracking and recognition performance may be improved and interaction usability may also be improved.

An exemplary embodiment of the invention will now be described with reference to FIG. 7, in which certain elements of an apparatus for enabling adaptive gesture analysis are displayed. As such, FIG. 7 illustrates a block diagram of a mobile terminal 110 that may benefit from exemplary embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, can readily employ embodiments of the present invention.

In addition, while several embodiments of the method of the present invention may be performed or used by or in connection with a mobile terminal 110, the method may be employed by or used in connection with devices other than a mobile terminal (e.g., personal computers (PCs), servers, or the like). Moreover, the system and method of embodiments of the present invention may have been primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 110 may include an antenna 112 (or multiple antennas) in operable communication with a transmitter 114 and a receiver 116. The mobile terminal 110 may further include an apparatus, such as a controller 120 (e.g., processor 70) or other processing element, that provides signals to and receives signals from the transmitter 114 and receiver 116, respectively. The signals may include signaling information in accordance with the air interface standard of the applicable cellular system, and/or may also include data corresponding to speech, received data and/or user generated/transmitted data. In this regard, the mobile terminal 110 may be capable of operating with one or more air interface standards, communication protocols, modulation types, and access types. By way of illustration, the mobile terminal 110 may be capable of operating in accordance with any of a number of first, second, third and/or fourth-generation communication protocols or the like. For example, the mobile terminal 110 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 110 may be capable of operating in accordance with non-cellular communication mechanisms. For example, the mobile terminal 110 may be capable of communication in a wireless local area network (WLAN) or other communication networks.

It is understood that the apparatus, such as the controller 120, may include circuitry for implementing, among others, audio/video and logic functions of the mobile terminal 110. For example, the controller 120 may comprise a digital signal processor device, a microprocessor device, and various analog to digital converters, digital to analog converters, and/or other support circuits. Control and signal processing functions of the mobile terminal 110 may be allocated between these devices according to their respective capabilities. The controller 120 thus may also include the functionality to encode and interleave message and data prior to modulation and transmission. The controller 120 may additionally include an internal voice coder, and may include an internal data modem. Further, the controller 120 may include functionality to operate one or more software programs, which may be stored in memory. For example, the controller 120 may be capable of operating a connectivity program, such as a conventional web browser. The connectivity program may then allow the mobile terminal 110 to transmit and receive web content, such as location-based content and/or other web page content, according to a Wireless Application Protocol (WAP), Hypertext Transfer Protocol (HTTP) and/or the like, for example.

The mobile terminal 110 may also comprise a user interface including an output device such as an earphone or speaker 124, a microphone 126, a display 128, and a user input interface, which may be operationally coupled to the controller 120. The user input interface, which allows the mobile terminal 110 to receive data, may include any of a number of devices allowing the mobile terminal 110 to receive data, such as a keypad 130, a touch display (not shown) or other input device. In embodiments including the keypad 130, the keypad 130 may include numeric (0-9) and related keys (#, *), and other hard and soft keys used for operating the mobile terminal 110. Alternatively, the keypad 130 may include a QWERTY keypad arrangement. The keypad 130 may also include various soft keys with associated functions. In addition, or alternatively, the mobile terminal 110 may include an interface device such as a joystick or other user input interface. The mobile terminal 110 further includes a battery 134, such as a vibrating battery pack, for powering various circuits that are used to operate the mobile terminal 110, as well as optionally providing mechanical vibration as a detectable output.

The mobile terminal 110 may further include a user identity module (UIM) 138. The UIM 138 is typically a memory device having a processor built in. The UIM 138 may include, for example, a subscriber identity module (SIM), a universal integrated circuit card (UICC), a universal subscriber identity module (USIM), a removable user identity module (R-UIM), etc. The UIM 138 typically stores information elements related to a mobile subscriber. In addition to the UIM 138, the mobile terminal 110 may be equipped with memory. The mobile terminal 10 may include volatile memory 140 and/or non-volatile memory 142. For example, volatile memory 140 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 140 non-volatile memory 142 may include a cache area for temporary storage of data. The memories can store any of a number of pieces of information, and data, used by the mobile terminal 110 to implement the functions of the mobile terminal 110. For example, the memories can include an identifier, such as an international mobile equipment identification (IMEI) code, capable of uniquely identifying the mobile terminal 110. Furthermore, the memories may store instructions for determining cell id information. Specifically, the memories may store an application program for execution by the controller 120, which determines an identity of the current cell, i.e., cell id identity or cell id information, with which the mobile terminal 110 is in communication.

In an exemplary embodiment, the mobile terminal 110 may include a media capturing module, such as a camera, video and/or audio module, in communication with the controller 120. The media capturing module may be any means for capturing an image, video and/or audio for storage, display or transmission. For example, in an exemplary embodiment in which the media capturing module is a camera module 137, the camera module 137 may include a digital camera capable of forming a digital image file from a captured image. As such, the camera module 137 may include all hardware, such as a lens or other optical device, and software necessary for creating a digital image file from a captured image. In an exemplary embodiment, the camera module 137 may be a 3D camera capable of capturing 3D image information indicative of depth and intensity.

FIG. 8 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing adaptive gesture analysis as illustrated, for example, in FIG. 8 may include dividing a distance range into a plurality of depth ranges at operation 200 and generating a plurality of intensity images for at least two image frames at operation 210. Each of the intensity images may provide image data indicative of a presence of objects at a corresponding depth range for a respective image frame. The method may further include determining motion variation between the two image frames for each corresponding depth range at operation 220 and determining depth of a target based at least in part on the motion variation at operation 230.

In an exemplary embodiment, dividing the distance range may include selecting distance intervals that are wider at near and far distances than distance intervals between the near and far distances. In some cases, generating the plurality of intensity images may include generating the plurality of intensity images for adjacent frames or, for each corresponding depth range for a particular frame, setting data corresponding to objects not at a current depth range to a predefined value and retaining data corresponding to the current depth range. In an exemplary embodiment, determining motion variation may include comparing object data in a current frame to object data in a previous frame to determine a change in intensity from the previous frame to the current frame and setting data not indicative of the change in intensity to the predefined value. In some embodiments, determining depth of the target may include determining target depth based on an integration of the motion variation with target location cue information.

In an exemplary embodiment, the method may include further optional operations as well, some examples of which are shown in FIG. 8 in dashed lines. In this regard, exemplary additional operations may include operation 240 which may involve tracking motion of the target based on the determining of the depth of the target. In some embodiments, the method may further include recognizing gesture features of the target to enable initiation of a user interface command based on a recognized gesture at operation 250.

In an exemplary embodiment, an apparatus for performing the method of FIG. 8 above may comprise a processor (e.g., the processor 70) configured to perform some or each of the operations (200-250) described above. The processor may, for example, be configured to perform the operations (200-250) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-250 may comprise, for example, the processor 70, respective ones of the depth analyzer 78, the motion analyzer 80, the target tracker 82, and the gesture recognizer 84, or an algorithm executed by the processor for controlling gesture recognition, hand tracking and depth determinations as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   dividing a distance range into a plurality of depth ranges;
   generating a plurality of intensity images for at least two image frames, each of the intensity images providing image data indicative of a presence of objects at a corresponding depth range of the plurality of depth ranges for a respective image frame;
   determining motion variation between the two image frames for each corresponding depth range; and
   determining depth of a target based at least in part on the motion variation.

2. The method of claim 1, wherein dividing the distance range comprises selecting distance intervals that are wider at near and far distances than distance intervals between the near and far distances.

3. The method of claim 1, wherein generating the plurality of intensity images comprises generating the plurality of intensity images for adjacent frames.

4. The method of claim 1, wherein generating the plurality of intensity images comprises, for each corresponding depth range for a particular frame, setting data corresponding to objects not at a current depth range to a predefined value and retaining data corresponding to the current depth range.

5. The method of claim 4, wherein determining motion variation comprises comparing object data in a current frame to object data in a previous frame to determine a change in intensity from the previous frame to the current frame and setting data not indicative of the change in intensity to the predefined value.

6. The method of claim 1, wherein determining depth of the target comprises determining target depth based on an integration of the motion variation with target location cue information.

7. The method of claim 1, further comprising tracking motion of the target based on the determining of the depth of the target.

8. The method of claim 7, further comprising recognizing gesture features of the target to enable initiation of a user interface command based on a recognized gesture.

9. An apparatus comprising;
   a processor; and
   a memory including computer program code, the memory and the computer program code configured to, with the processor, cause the apparatus to at least:
   divide a distance range into a plurality of depth ranges;
   generate a plurality of intensity images for at least two image frames, each of the intensity images providing image data indicative of a presence of objects at a corresponding depth range of the plurality of depth ranges for a respective image frame;
   determine motion variation between the two image frames for each corresponding depth range; and
   determine depth of a target based at least in part on the motion variation.

10. The apparatus of claim 9, wherein the memory including the computer program code is further configured to, with the processor, cause the apparatus to divide the distance range by selecting distance intervals that are wider at near and far distances than distance intervals between the near and far distances.

11. The apparatus of claim 9, wherein the memory including the computer program code is further configured to with the processor, cause the apparatus to generate the plurality of intensity images by generating the plurality of intensity images for adjacent frames.

12. The apparatus of claim 9, wherein the memory including the computer program code is further configured to, with the processor cause the apparatus to generate the plurality of intensity images by, for each corresponding depth range for a particular frame, setting data corresponding to objects not at a current depth range to a predefined value and retaining data corresponding to the current depth range.

13. The apparatus of claim 12, wherein the memory including the computer program code is further configured to, with the processor, cause the apparatus to determine motion variation by comparing object data in a current frame to object data in a previous frame to determine a change in intensity from the previous frame to the current frame and setting data not indicative of the change in intensity to the predefined value.

14. The apparatus of claim 9, wherein the memory including the computer program code is further configured to, with the processor, cause the apparatus to determine depth of the target by determining target depth based on an integration of the motion variation with target location cue information.

15. The apparatus of claim 9, wherein the memory including the computer program code is further configured to, with the processor, cause the apparatus to track motion of the target based on the determining of the depth of the target.

16. The apparatus of claim 15, wherein the memory including the computer program code is further configured to, with the processor, cause the apparatus to recognize gesture features of the target to enable initiation of a user interface command based on a recognized gesture.

17. A computer program product comprising at least one computer-readable non-transitory storage medium having computer-executable program code instructions stored therein, the computer-executable program code instructions comprising:
   first program code instructions for dividing a distance range into a plurality of depth ranges;
   second program code instructions for generating a plurality of intensity images for at least two image frames, each of the intensity images providing image data indicative of a presence of objects at a corresponding depth range of the plurality of depth ranges for a respective image frame;

third program code instructions for determining motion variation between the two image frames for each corresponding depth range; and fourth program code instructions for determining depth of a target based at least in part on the motion variation.

18. The method of claim 17, wherein the first program code instructions include instructions for selecting distance intervals that are wider at near and far distances than distance intervals between the near and far distances.

19. The computer program product of claim 17, wherein the second program code instructions include instructions for generating the plurality of intensity images for adjacent frames.

20. The computer program product of claim 17, wherein the second program code instructions include instructions for setting data corresponding to objects not at a current depth range to a predefined value and retaining data corresponding to the current depth range, for each corresponding depth range for a particular frame.

21. The computer program product of claim 20, wherein the third program code instructions include instructions for comparing object data in a current frame to object data in a previous frame to determine a change in intensity from the previous frame to the current frame and setting data not indicative of the change in intensity to the predefined value.

22. The computer program product of claim 17, wherein the fourth program code instructions include instructions for determining target depth based on an integration of the motion variation with target location cue information.

23. The computer program product of claim 17, further comprising fifth program code instructions for tracking motion of the target based on the determining of the depth of the target.

24. The computer program product of claim 23, further comprising sixth program code instructions for recognizing gesture features of the target to enable initiation of a user interface command based on a recognized gesture.

25. An apparatus comprising:
means for dividing a distance range into a plurality of depth ranges;
means for generating a plurality of intensity images for at least two image frames, each of the intensity images providing image data indicative of a presence of objects at a corresponding depth range of the plurality of depth ranges for a respective image frame;
means for determining motion variation between the two image frames for each corresponding depth range; and
means for determining depth of a target based at least in part on the motion variation.

26. The apparatus of claim 25, wherein means for generating the plurality of intensity images comprises means for setting data corresponding to objects not at a current depth range to a predefined value and retaining data corresponding to the current depth range, for each corresponding depth range for a particular frame.

* * * * *

UNITED STATES PATENT AND TRADEMARK OFFICE
CERTIFICATE OF CORRECTION

PATENT NO. : 8,325,978 B2
APPLICATION NO. : 12/261108
DATED : December 4, 2012
INVENTOR(S) : Chai et al.

It is certified that error appears in the above-identified patent and that said Letters Patent is hereby corrected as shown below:

In the Specification:

Column 7,
Line 65, " $\Delta I_{(i,t-1)}{}^{i}$ " should read -- $\Delta I^{i}{}_{(i,t-1)}$ --.

Column 8,
Lines 13, 14, 52, and 55, " $\Delta I_{(i,t-1)}{}^{i}$ " should read -- $\Delta I^{i}{}_{(i,t-1)}$ --.

Column 9,
Lines 26, 27, 29, and 40, " $\Delta I_{(i,t-1)}{}^{k}$ " should read -- $\Delta I^{k}{}_{(i,t-1)}$ --.
Line 34, " $\Delta I_{(i,t-1)}{}^{k}$ " both occurrences, should read -- $\Delta I^{k}{}_{(i,t-1)}$ --.

In the Claims:

Column 16,
Line 1, "comprising;" should read --comprising:--.

Signed and Sealed this
Eleventh Day of June, 2013

Teresa Stanek Rea
*Acting Director of the United States Patent and Trademark Office*